No. 756,871. PATENTED APR. 12, 1904.
S. G. MARSHUTZ.
SPECTACLES.
APPLICATION FILED MAR. 4, 1899.
NO MODEL. 2 SHEETS—SHEET 1.

Witnesses
Inventor:
Siegfried G. Marshutz,
by Dodge & Sons,
Attorneys.

No. 756,871. PATENTED APR. 12, 1904.
S. G. MARSHUTZ.
SPECTACLES.
APPLICATION FILED MAR. 4, 1899.
NO MODEL. 2 SHEETS—SHEET 2.
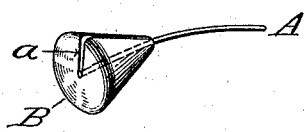
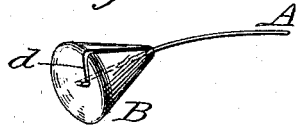
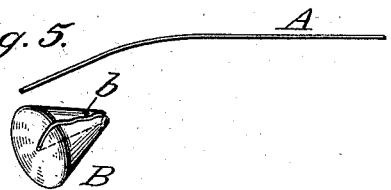
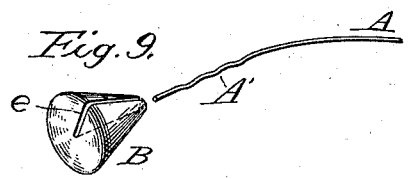
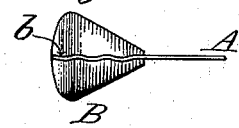
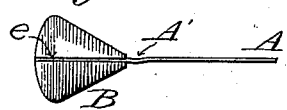
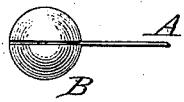
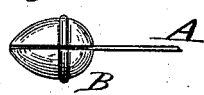
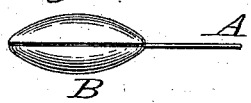
Witnesses
Inventor:
Siegfried G. Marshutz,
by Dodge & Sons,
Attorneys.

No. 756,871.

Patented April 12, 1904.

UNITED STATES PATENT OFFICE.

SIEGFRIED G. MARSHUTZ, OF LOS ANGELES, CALIFORNIA.

SPECTACLES.

SPECIFICATION forming part of Letters Patent No. 756,871, dated April 12, 1904.

Application filed March 4, 1899. Serial No. 707,787. (No model.)

*To all whom it may concern:*

Be it known that I, SIEGFRIED G. MARSHUTZ, a citizen of the United States, residing at Los Angeles, in the county of Los Angeles and State of California, have invented certain new and useful Improvements in Spectacles, of which the following is a specification.

My invention pertains to spectacles, and more especially to means for retaining them in position upon the nose of the wearer.

The device is illustrated in the accompanying drawings, in which—

Figure 1:
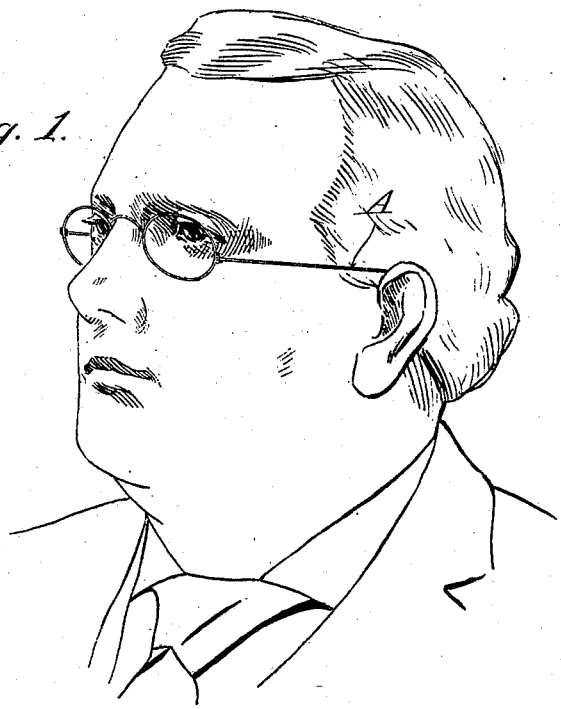
Figure 2:
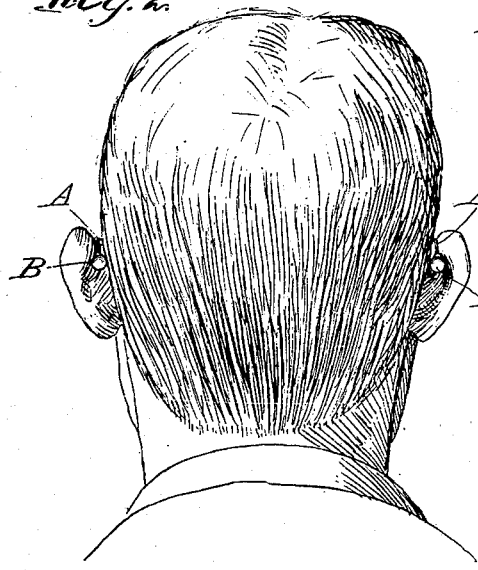
Figure 3:
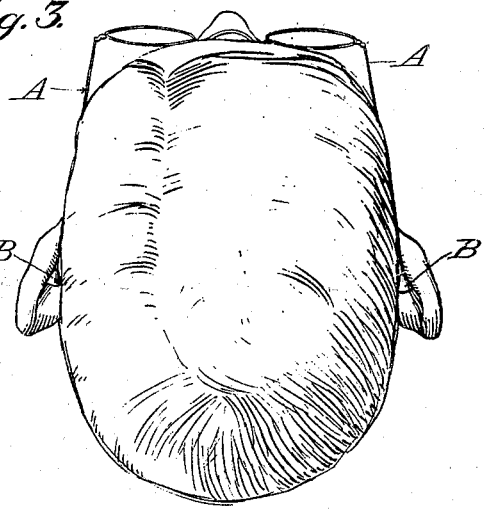

Figure 1 is a view representing the spectacles in position upon a wearer and showing how the retainers are hidden from view; Fig. 2, a view from behind the wearer, showing the position of the retainers; Fig. 3, a view looking down from above the wearer to better show the manner in which the retainers act; Figs. 4 to 14, inclusive, views showing the retainer in different forms and illustrating certain variations therein and in the "temples" to which they are applied.

Wearers of spectacles are well aware that serious inconvenience and annoyance attend the use of spectacles as commonly constructed and notwithstanding various attempts that have been made to provide means for retaining them in position. It is of course essential to the attainment of the best results from the use of any style of glasses that they be so held that the pupils or the centers of the lenses of the eyes be coincident with the centers of the lenses of the glasses and that the glasses be brought to and retained at proper focal distance from the eyes. It is likewise important that means be provided for retaining the frame of the glasses in place upon the nose of the wearer without undue pressure thereon and without causing noticeable pressure upon the temples or the ears of the wearer. Various means have been adopted or proposed with a view to attaining the stated objects. Among these may be mentioned the common straight temples having their free ends connected by strings to be tied behind the head or by an elastic band, the so-called "riding" frame, the temples of which are curved to lie in the angle or depression at the back of the outer ear marking its junction with the head, "cable-wire" reading-frames in which a light inner wire is encircled by a spirally-wound wire, rubber-covered riding frames, and riding frames with arched blocks or saddles to rest upon the upper part of the ear between the outer rim thereof and the head, while the downwardly-curled ends fit behind the ears, as usual. Other plans provide for spring-pressure against the temples or the sides of the wearer's head, and various other methods of retention have been proposed, all of which possess one or another objectionable feature. Riding frames under all the varying constructions or adaptations known to the trade produce a pressure upon the nerves lying back of the external ear or in the ear itself which is frequently exceedingly painful and with many persons is absolutely prohibitive of such frames. Pressure upon the wearer's temples is also oppresive and frequently productive of pain or discomfort, and the strain put upon the bridge-piece of the frame throws the lenses out of plane, and thereby greatly impairs their usefulness or causes injury to the eyes.

All or nearly all forms of retaining devices known to me have a tendency to draw the bridge-piece of the frame so firmly against the nose as to produce pain and soreness at the point of bearing and also to bring the lenses unduly near the eyes, thus causing a constant and injurious straining of the eyes to adapt themselves to the faulty adjustment of the glasses.

A careful examination of the form of the auricle or the external ear and of its position relative to the head will disclose the fact that at the front the ear lies close to the head and that from that point its rim or the helix of the ear springs upward and outward in a manner well illustrated in Figs. 2 and 3 of the accompanying drawings. The concha swells or rounds outward and forms a support for the antihelix and the helix, connecting these parts with the head and holding the helix in the relative position indicated. As a consequence of this formation there is produced between the helix and the head or skull and above the concha a triangular or a V-shaped space (plainly shown in Figs. 2 and 3) admirably adapted to receive a conical or tapering button, knob, or enlargement when the latter is dropped or pressed down from above, but likewise preventing the withdrawal of such enlargement directly forward or without being first lifted from the V-shaped seat mentioned. Availing myself of this peculiar formation I provide the temples or side bars of spectacles with knobs, buttons, or enlargements of form to fit or to occupy the V-shaped spaces, but incapable of being drawn through the narrow forward end of said space. The temples or side bars of the frame are preferably made straight to a point just over the saddle of the ear or immediately back of the point at which the helix springs from the head, and thence are given a somewhat sharp downward bend which causes the knob or button, if of conical or like form, to fit snugly within the cavity or seat described. Lying in this position the knobs or buttons prevent the spectacles from falling or drawing forward, yet do not exert any backward strain or pull which would cause the bridge-piece of the frame to bear with force upon the bridge of the nose. Spectacles provided with this device will retain their place, even though the head be thrown far forward, as is often necessary with draftsmen, engravers, machinists, and others, and this is done without any unpleasant or noticeable pressure at any point. The spectacles may be readily removed by merely lifting slightly the retaining knobs or buttons, and they may be placed in position through the use of a single hand and without difficulty.

Referring again to the drawings, Fig. 1 shows the frame with the straight temple or side bar, such as I prefer to use. The joints or hinges by which the side bars are attached to the rims or lens-frames are made free and allowed to open far enough to prevent the possibilty of side pressure against the head of the wearer, so as to relieve the frame of all spring-pressure.

It is found and is a well-recognized fact among oculists and opticians that the lengths of temples required in a given spectacle-frame commonly vary, being longer for one than for the other side, or, in other words, that the human ear is frequently located farther forward on one side of the head than on the other. So, too, there is often a difference in the size and formation of the ear and occasionally a difference in their height. From all these causes it becomes necessary to provide means for readily locating and firmly securing in place the retaining devices, so that the optician or the purchaser may readily and certainly affix the retainers in their proper position upon any ordinary style of frame. To this end I have devised a variety of forms or embodiments of my invention, which are illustrated in Figs. 4 to 14, inclusive. In all these figures there is present some form of wedging or clamping device calculated to hold the retainer at its proper adjustment upon the temple or side bar with such security as to insure it against accidental displacement. It is desirable, however, that while thus safe against unintentional detachment the device be capable of removal when required, so that it may be adjusted, if need be, or transferred to another frame. This effect I secure by forming or providing the button, knob, or retainer with a slot, groove, or channel either of decreasing width from the periphery toward the axis of the retainer or of irregular, curved, or angular outline or straight, but combined with a temple which is curved or angular in the direction of its length. The different embodiments will be better understood upon referring separately to the figures of the drawings.

Fig. 4 shows the temple A slightly bent or curved downward at its rear end and forced or wedged into a slightly-narrowing slot or groove $a$, formed in the retainer B from its periphery to or slightly beyond its longitudinal axis. By firmly pressing the end of the temple into the wedging-groove, if the retainer be of material possessing even a slight degree of elasticity—as, for instance, ivory or celluloid—it will wedge therein so firmly as to insure the retention of the device upon the temple. If desired, the temple may be slightly roughened or fluted to give greater friction. In practice the temple will be made longer than actually required or than required for the average wearer, the retainer will be adjusted thereon, and then the protruding end will be cut off flush with the back end of the retainer, as indicated in Fig. 4.

In Fig. 5 I have shown a retainer B of the same external form as in Fig. 4; but the slot or groove $b$ is made wavy or is curved, so that if a light temple be pressed into said groove it will partake of the curved or wavy form which will preclude its being drawn longitudinally through the retainer and will prevent the retainer from moving endwise off the temple. The groove or slot $b$ need not in this case be made of decreasing width toward its bottom, because the lateral bending or springing of the temple will cause it to bind sufficiently in the groove to retain it in place.

Fig. 6 illustrates the construction just shown after the parts are adjusted and the extremity or protruding end of the temple, if any there be, is cut off. In Fig. 7 the same general form of retainer B is represented; but the slot or groove $c$ is made to wind spirally inward from the periphery of the retainer toward its longitudinal axis, and the temple is carried laterally into said spiral groove or slot until it finally arrives at the narrow or contracted inner wall thereof in alinement with the longitudinal axis of the retainer. Fig. 8 shows a like form of retainer with the slot passing from the circumference of the retainer inward to a point slightly to one side of the longitudinal axis of the retainer, then turning abruptly inward to said axis and narrowing toward said line, as shown. The action and the mode of using this retainer are essentially the same as with the construction shown in Fig. 4; but since the slot does not lead directly from the axis of the retainer to its surface there is less liability of the retainer being lost off in the event of its beginning to loosen.

Fig. 9 shows the retainer of the same form and construction as in Fig. 4, except that the groove or slot $e$ is or may be of uniform width throughout, or it may, if desired, be slightly decreased in width. This form is intended to be used in connection with a temple A, having a crimped free end A', adapted to be seated in the groove by first passing in the uncrimped portion of the temple and thereafter forcibly drawing the crimped, twisted, or bent portion of the temple into the groove. The crimping should be in different directions about the axis of the temple or, in other words, should be in the nature of a very slight spiral bending or coiling, so that the projection or enlargement shall be in all directions about the axis of the temple and so that there shall be pressure against the side walls of the slot however the retainer may be turned relatively to the temple.

Fig. 10 is a plan view of the device shown in Fig. 9 with the bends taken out of the temple or suppressed by the further drawing of the temple into the groove.

Figs. 11, 12, and 13 show other forms of retainer which may be made fast to the temples in any of the ways above described.

Fig. 14 shows the retainer formed of sheet metal and having the outward shape of that shown in Figs. 4 to 10, inclusive.

While the forms shown in Figs. 11, 12, and 13 answer measurably well, they do not give the satisfactory results of the form shown in Figs. 4 to 10, inclusive. The cone-shaped retainer fits and fills the space or cavity described snugly and closely, and as a consequence all liability of the spectacles to become loose or to fall from position is avoided, even a violent shaking of the head failing to dislodge them. Viewed from in front the spectacles present the appearance of an ordinary straight-templed frame, the knobs, buttons, or retainers lying in the space behind the ear or between the ear and the head, entirely concealed from view from the front.

Practical and extended use of the device has resulted in its indorsement by oculists and by many wearers. All agree that the retainer here described holds the glasses securely and in proper position and that they give no discomfort whatever in use.

The forms of device shown and the provisions for securing the same in position may be varied somewhat without departing from the spirit or substance of my invention, the important features of which are the adaptation of the retainer to the space between the head and the ear, the ready and convenient application and removal of the retainer, and its firm retention by friction at any desired point without danger or liability of its becoming loose and shifting therefrom.

It is essential to the carrying out of my invention that the temple be rigid and self-supporting or capable of maintaining permanently the form given it unless subjected to a material or considerable pressure tending to distort it or change its initial form. Similarly the retainer, knob, or button has to be of rigid character and capable of maintaining its form, though slight resilience or elasticity is permissible in the temple. In other words, it is essential that the temple be sufficiently rigid to maintain the retainer constantly in definite relation to the lens-frame, both as to height and as to distance. In this respect the device is unlike rope-clamps, clothes-line fasteners, and similar articles wherein a strain or tension must be placed upon the rope or other flexible band or body in order to cause it to cramp or bind in an irregular channel or groove. The slight resilience of the temple or of the knob or retainer, as the case may be, sufficient to permit a minute distortion of one or the other with the consequent cramping, wedging, or binding effect insures the sufficiently-firm attachment of the knob or retainer to the temple and the maintenance of its proper position or adjustment thereon.

The terms "temples" and "side bars" are used to designate any bar or member extending rearwardly from the lens-frame toward the ears of the wearer for the purpose of holding the lens-frame in position before the eyes of the wearer. The terms "slot," "groove," and "channel" are used to designate and are each meant to include any opening extending longitudinally of the retainer, knob, or button and reaching to the surface thereof at one side. The use in the claims of any one of these terms will be with this comprehensive meaning. The expression "a spectacle-temple or side bar of normally different outline in the direction of its length from that of the slot of the retainer" means that the slot may be straight and the temple curved, bent, or fluted; that the temple may be straight and the slot curved, bent, or irregular in form, or that one may be curved or bent in one direction and the other in a different direction, so that in order to force the temple into the groove or slot pressure must be applied sufficient to distort, at least minutely, the one or the other member, and thus to produce frictional pressure sufficient to maintain a firm and permanent attachment of the knob or retainer to the temple.

Having thus described my invention, what I claim is—

1. In combination with the temples of a pair of spectacles, retainers, each provided with a slot extending from end to end thereof and opening laterally to the surface to permit lateral introduction and removal of the temple, the slot being of a form to cause the temple to bind therein when forced to its seat or bearing.

2. As a new article of manufacture, a retainer for spectacles, provided with a slot extending from its lateral surface inward toward its longitudinal axis, and of a form to receive and automatically bind a spectacle-temple when the latter is pressed into the slot.

3. In combination with a retainer having a slot extending in the direction of its length, a spectacle-temple normally of a shape different from that of said slot and introduced into the slot under pressure, whereby it is slightly distorted from its normal form and caused to bind and hold within the slot by reason of the friction incident to such distortion.

In witness whereof I hereunto set my hand in the presence of two witnesses.

SIEGFRIED G. MARSHUTZ.

Witnesses:
   W. C. GREEN,
   LIZZIE NOBLE.